Feb. 17, 1948. G. F. ROTSLER 2,436,122
INJECTION MOLDING APPARATUS
Filed March 20, 1944 2 Sheets-Sheet 1
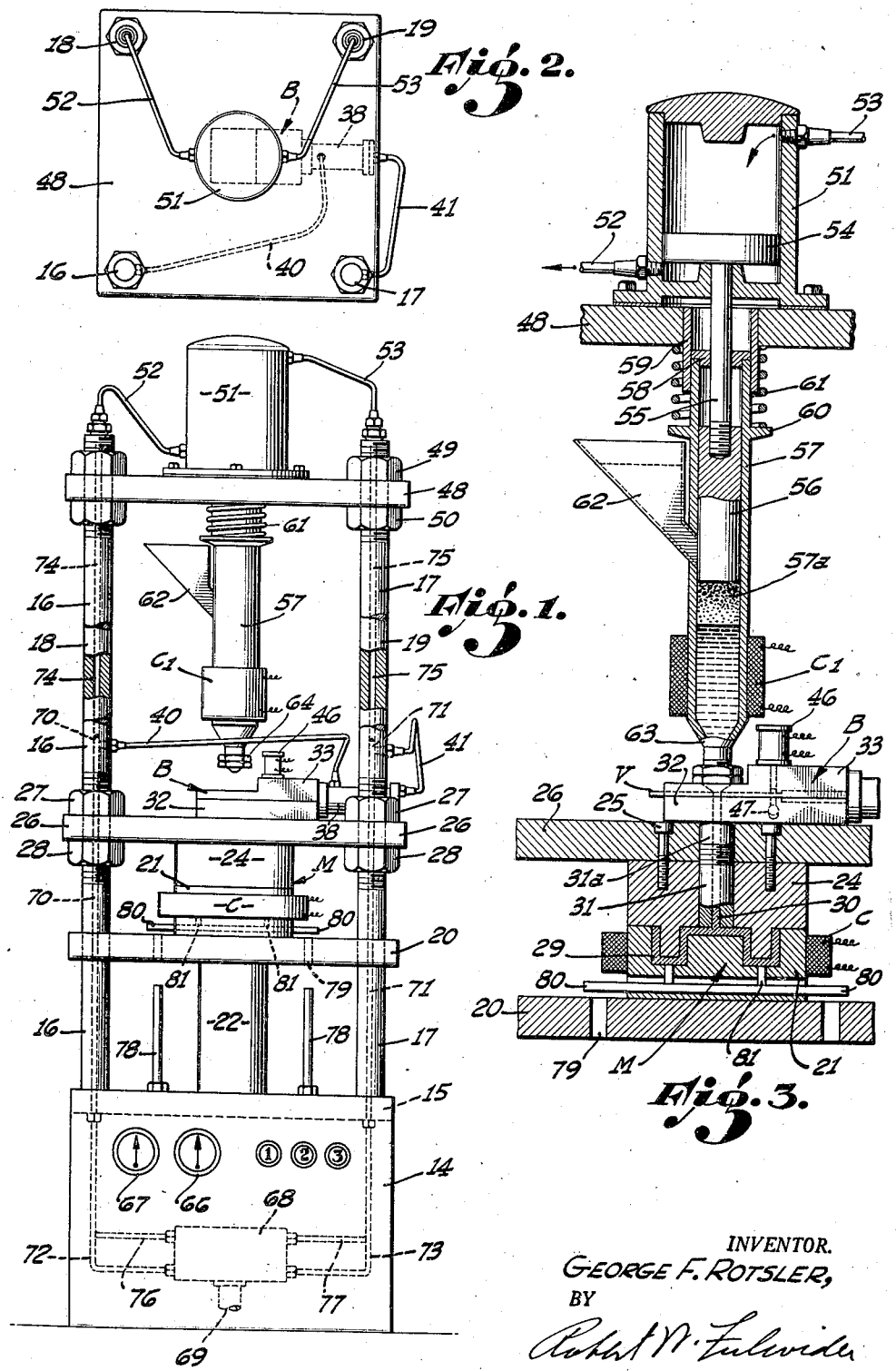
INVENTOR.
GEORGE F. ROTSLER,
BY
ATTORNEY.

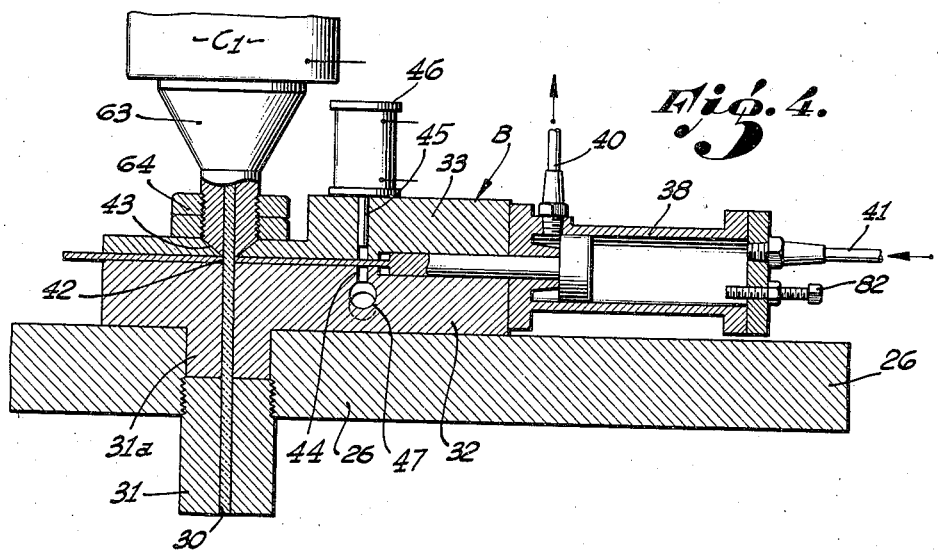
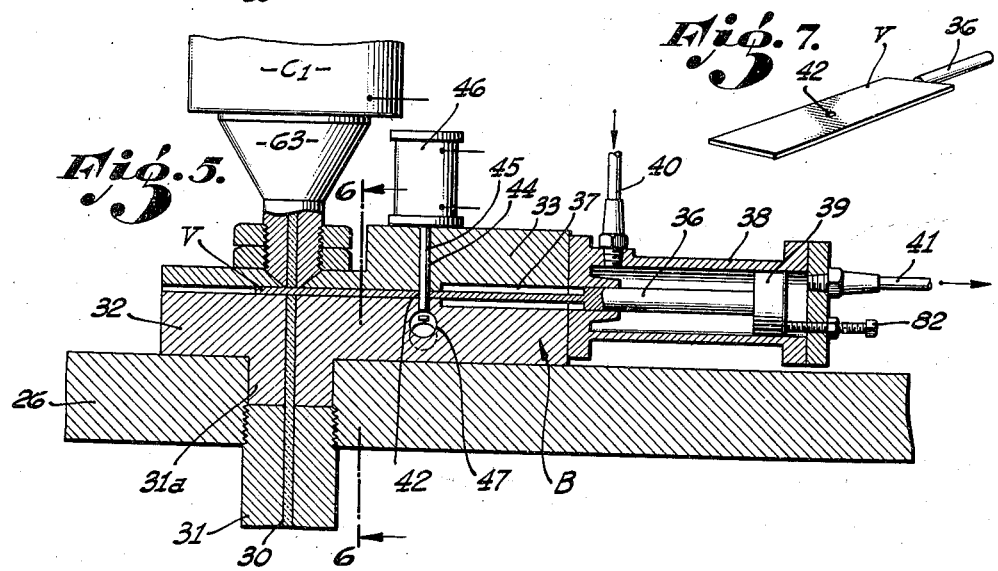
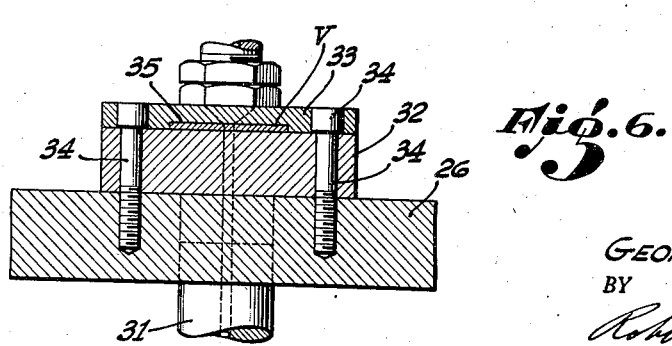

Patented Feb. 17, 1948

2,436,122

UNITED STATES PATENT OFFICE 2,436,122

INJECTION MOLDING APPARATUS

George F. Rotsler, Los Angeles, Calif.

Application March 20, 1944, Serial No. 527,186

7 Claims. (Cl. 18—30)

My invention relates generally to the molding of plastic products, and more particularly to an improved apparatus whereby thermosetting plastics can be successfully molded by the injection method.

The application of the injection principle, originally used only for thermoplastic materials, has had some measure of success under the name of transfer molding. However, so far as I am aware, this method has not proved satisfactory from a practical production point of view, since the many delays occurring between steps have prevented anything approaching continuous production.

One of the principal objects of my invention is to provide a molding apparatus adaptable to the fabrication of either thermosetting materials or thermoplastic materials, but particularly to the molding of thermosetting materials. By eliminating the possibility of the molding material setting up prior to its injection into the mold, and the consequent interruption occasioned thereby in the repeated performance of the method by the machine, I provide a machine which is substantially continuous in operation.

It is also an object of my invention to provide an injection type molding machine in which setup of the molding material before its injection into the mold is avoided by the automatic separation of the mold and the injecting mechanism immediately following injection of the softened material charge into the heated mold, so that the following charge is removed from the curing heat zone of the mold and therefore cannot set up.

A further object of my invention is the provision of an injection molding machine which includes a valve mechanism interposed between the mold and the injecting mechanism for automatically sealing the mold cavity following injection of the plastic material into the mold to thereby maintain the material under pressure in the mold cavity, whereby the final molded product takes the exact shape and form of the mold, is uniform in color, and has a lasting surface luster without additional finishing operations.

Another object of my invention is the provision of an injecting mechanism which is characterized by its ability to effect a fluid-tight seal between its outlet nozzle and the valve structure and to prevent leakage of the material at that point.

These and other objects and advantages of my invention will become apparent from the following description of a preferred form of my method and apparatus and from the accompanying drawings, in which:

Fig. 1 is a view showing in front elevation one form of injection molding machine embodying my invention, with portions of the front standards broken away and portions of the rear standards in section;

Fig. 2 is a top plan of the machine shown in Fig. 1;

Fig. 3 is an enlarged fragmentary vertical sectional view of a part of the machine shown in Fig. 1;

Fig. 4 is an enlarged fragmentary vertical sectional view of a part of the machine particularly illustrating the valve mechanism, and wherein the valve is in open position;

Fig. 5 is a view similar to Fig. 4 showing the valve in closed position;

Fig. 6 is a vertical sectional view taken on the line 6—6 of Fig. 5, and

Fig. 7 is a detailed perspective view on a reduced scale showing the valve of the preceding figures.

Similar reference characters refer to similar parts in each of the several views.

The machine in its present embodiment may comprise a housing 14 which is preferably of cubical form, and includes a top 15 in the four corners of which are secured the lower ends of uprising standards 16, 17, 18 and 19. Slidably mounted for vertical movement on the lower portions of these standards is a movable platen 20, and suitably secured to the upper side of this platen is the lower and movable section 21 of a mold M. The platen 20 is actuable to occupy an elevated position and a lowered position, by means of a piston 22 slidable through the top 15 and operating in a cylinder (not shown) contained in the housing 14 and to which pressure fluid is adapted to be supplied for actuation of the piston as will be later described. The mold M also includes a stationary section 24 secured by screws 25 to the underside of a stationary platen 26, the latter in turn being secured at its four corners to the standards 16, 17, etc., by nuts 27 and 28, threaded on the standards to adjust the platen to the required vertical position.

The mold sections 21 and 24 are adapted to be heated by any suitable medium, such for example, as the electrical heating coil C, for the purpose of maintaining the mold at a proper temperature for curing the thermosetting material injected into the mold. As best shown in Fig. 3, the mold section 21 is provided with a cavity 29 which connects with the sprue 30 of a bushing 31.

The upper end of the sprue bushing 31 is screwed into the platen 26 to abut an extension 31a which forms a continuation of the bushing and sprue. The extension 31a is formed on the lower section 32 of a valve body B, this body also including an upper section 33, and the two sections being secured by bolts 34 to the platen 26. The upper section 33 is recessed on its underside to form a slot 35 in which a valve V is slidably received, this valve preferably being in the form of a plate and having a stem 36 slidable in a channel 37 formed between the sections 32 and 33.

Secured to the channel end of the valve body B is a cylinder 38, one end of which is open to receive the valve stem 36 so that such stem forms the rod of a piston 39 operable within the cylinder. By means of pipes 40 and 41 connected to the ends of the cylinder 38, as illustrated in Figs. 4 and 5, pressure fluid can be supplied to either side of the piston 39 to move the valve V to the open position shown in Fig. 4 or to the closed position shown in Fig. 5. In the open position of the valve a port 42 therein registers with the sprue 30, and from this point the sprue extends upwardly through the body B to a conical seat 43 in the upper side of the body. In this position of the valve the sprue 30 is open to the seat 43 to allow the plastic material to be injected into the mold cavity 29 as will be more fully described hereinafter.

In the closed position of the valve V, the port 42 is moved into registration with a passage 44 in the upper valve body portion 33 to allow the plunger 45 of a solenoid 46 to eject from the port that slug of material which remains therein following each injecting operation. As this slug is ejected from the port, it falls into a passage 47 from which it may be removed by a blast of air from any suitable source (not shown).

Disposed above the valve body B and its operating mechanism is situated a mechanism for injecting plastic material into the molding cavity 29 in proper timed relation to the operation of the valve V and the opening and closing of the mold M. This mechanism may comprise a platform 48 mounted for vertical adjustment adjacent the upper ends of the standards 16, 17, etc., by nuts 49 and 50. Secured to the upper side of the platform 48 is a power cylinder 51 provided with pipes 52 and 53 for supplying pressure fluid to either side of a piston 54 for lowering or elevating the piston within the cylinder. The piston 54 is provided with a rod 55 extending downwardly through an opening in the platform 48, and connected at its lower end to a ram 56 operating in a cylinder 57 partly closed at its upper end by a head 58. The cylinder 57 and its head are movable vertically within a stationary sleeve 59 secured within the opening in the platform 48. The cylinder 57 is provided with an annular flange 60 to form a seat for the lower end of a coiled compression spring 61 surrounding the sleeve 59 between the flange and the underside of the platform and designed to yieldably urge the cylinder downwardly.

The cylinder 57 carries a hopper 62 which constitutes a reservoir for plastic material in granular or powdered form adapted to gravitate from the hopper into the cylinder 57 and thereby provide a constant source of material supply for the cylinder. The lower end of the cylinder 57 is provided with a nozzle 63 better shown in Fig. 4 as having a conical end to fit within the seat 43, and provided with nuts 64 by which the lowermost position of the nozzle can be adjusted to effect a fluid tight fit within the seat. The interior of the cylinder 57 constitutes a loading or plasticizing chamber indicated at 57a, from which a charge of plastic material is injected into the mold cavity 29 through the nozzle 63 and the sprue 30. However, incident to this charging operation, the plastic material within the chamber 57a must be plasticized to give flow quality thereto in order that it may be effectually transferred from the cylinder into the mold by operation of the ram 56. To reduce the material to this plasticized state any suitable heating medium may be employed such as the electrical heating coil C1 arranged about the cylinder adjacent the nozzle 63.

The heats generated by the respective coils C and C1 must of necessity be controlled to maintain those temperatures in the plasticized chamber 57a and the mold cavity 29 requisite to first plasticize and then cure the material. Means for effecting such a control is conventional, and as shown in Fig. 1, controls 66 and 67 are provided for this purpose.

Fluid pressure may be supplied to the cylinder 38 for operating the valve mechanism, to the cylinder 51 for actuating the injection mechanism and to the cylinder for operating the piston 22 by any conventional fluid pressure system. In Fig. 1 such a system is shown as including a valve housing 68 within the housing 14 and containing the necessary valves to control the supply of fluid pressure from a source 69 to the cylinders 38 and 51, and to the cylinder for actuating the piston 22, all in a manner to effect operation of the machine in the prescribed manner.

For circulating fluid in either direction to or from the cylinder 38 the pipe 40 is connected to a duct 70 in the standard 16, while the pipe 41 is connected to a duct 71 in the standard 17. The lower ends of these ducts 70 and 71 are connected by pipes 72 and 73 to the valve housing 68.

For circulating fluid in either direction to and from the power cylinder 51 the pipe 52 is connected to the upper end of a duct 74 in the standard 18, while the pipe 53 is similarly connected to a duct 75 in the standard 19. The lower ends of these ducts 74 and 75 are connected by pipes 76 and 77 to the valve housing 68. Thus by forming the ducts in the several standards, the standards are utilized as pipes for the fluid pressure system, thereby eliminating the use of additional pipes.

Operation of the valves contained within the housing 68 may be effected automatically and in proper timed sequence to operate the valve mechanism, the material injecting mechanism and the piston 22 to open and close the mold in the successive and continuous fabrication of the plastic material into molded products. The means for operating the valves may be conventional, and hence have not been shown in detail, but only knobs 1, 2 and 3 (Fig. 1) by which operation of the valves may be individually timed.

As is conventional in injection molding machines of this character, means is provided for effecting automatic ejection of the molded product from the mold M following each molding operation. In the present instance, this means comprises a pair of rods 78 secured to and rising from the top 15 and movable through openings 79 in the platen 20 when the latter is lowered, to engage and lift arms 80. These arms are movable in the lower mold section 21 and being connected to knock-out pins 81 disposed below the mold cavity, operate to elevate the pins and eject the molded product, when lifted.

Operation of the machine in the performance of the molding method to fabricate a product, is as follows:

With the parts of the machine in the positions shown in Fig. 1, and the loading chamber 57a and the mold cavity heated to the requisite temperatures for plasticizing and curing, fluid pressure supplied to the upper side of power piston 54 moves it downwardly and imparts a corresponding movement to the ram 56. As the ram moves downwardly the injection cylinder 57 descends under the expansive action of the spring 61, and thus the cylinder is driven downward in advance of the ram to cause the nozzle 63 to tightly fit in the seat 43 and thereby place the cylinder in communication with the valve port 42. The remaining movement of the ram forces that charge of thermosetting material plasticized by the heating medium 65 and in advance of the ram as supplied to the cylinder from the hopper 62, through the nozzle 63, and into the mold cavity 29 by way of the valve port 42 and the sprue 30.

From this mode of operation of the ram, cylinder and spring, it will be clear that the nozzle is automatically sealed on the valve body before actual pressure is exerted on the material in the cylinder 57 so that no material is prematurely ejected to cause improper seating of the nozzle and leakage of the material at this point.

Once the material charge has been transferred to the mold cavity, fluid pressure is supplied to the cylinder 38 to retract the piston 39, and move the valve V to close the sprue and seal the material in the cavity. The precise closed position of the valve to bring the port 42 into registration with the passage 44 may be determined by a previous adjustment of a set screw 82 associated with the cylinder and piston as shown in Fig. 5. Upon the valve V reaching closed position the solenoid 46 becomes energized to actuate the plunger 45 and eject the slug remaining in the port into the passage 47.

The plasticized material being now sealed in the mold cavity and under great pressure is subjected to the heat of the coil C until cured, whereupon the platen 20 is automatically lowered to open the mold and eject the molded product. Meanwhile, however, immediately following closure of the valve V, fluid pressure is supplied to the lower side of the power piston 54 to retract the ram 56 to its original elevated position, and through its engagement with the head 58 the injection cylinder 57 and the nozzle 63 are retracted to elevated position, and the spring 61 again compressed. As the ram reaches its uppermost position it uncovers the feeding end of the hopper 62 to allow a second charge of material to enter the chamber 57a.

The purpose of retracting the injection assembly immediately following transfer of the charge and closure of the valve as above described is to remove the second charge of material from the heat zone of the mold and its heating element. If it were allowed to remain in that heat zone, the temperature of the cylinder and nozzle would quickly rise to cause the plasticized material therein to set up or harden. Manifestly if this were permitted to occur the only recourse would be to stop the machine, disassemble the injection assembly and remove the hardened material. Thus by eliminating this possibility, operation of the machine in the successive molding of plastic products is made continuous.

While I have described the operation of the machine in the fabrication of thermosetting materials, it is to be understood that by dispensing with the heating medium for the mold and substituting a suitable cooling medium, the machine is adaptable to the fabrication of thermoplastic materials. Also, that while the machine has been illustrated and described as being vertical, it can with slight modification be used horizontally.

I claim:

1. An injection molding machine for plastic materials, including: a mold having a cavity therein; a valve body having a sprue leading to the mold cavity; a seat in said body at the entrance end of said sprue; a plate valve having a port therein and slidable in said body to open and close said sprue by the registry or non-registry of said port with said sprue; a cylinder having a nozzle thereon adapted to engage said seat; a source of plastic material for said cylinder; a ram movable in one direction in said cylinder to admit a charge of material to said cylinder from said source, and in another direction to eject the charge from said nozzle; mechanism operable to open said valve, move said cylinder so as to press said nozzle on said seat, then move said ram in that direction to eject the material charge from said nozzle and into said cavity through said sprue, and finally to close said valve; and a plunger positioned adjacent the path of said valve plate in registry with said valve port when said valve is in a retracted position out of registry with said sprue.

2. An injection molding machine for plastic materials, including: a valve body having a sprue leading to the cavity of a mold and a valve receiving channel therein; a seat in said body at the entrance end of said sprue; a plunger disposed adjacent said channel; a valve plate reciprocably slidable in the channel in said body to open and close said sprue, said valve plate having a port therein registering with said sprue when in one position and registering with said plunger when in another position; a cylinder having a nozzle thereon adapted to engage said seat; a source of plastic material for said cylinder; a ram movable to eject a charge from said nozzle; a plunger; and mechanism operable to reciprocate said valve plate to register said valve port and sprue, move said cylinder so as to press said nozzle on said seat, then move said ram to eject the material charge from said nozzle and into said mold cavity through said sprue, and then to close said valve by moving said valve plate port out of registry with said sprue and into registry with said plunger and move said ram in the opposite direction, and to move said cylinder so that said nozzle is separated from said valve body, immediately upon closure of said valve, and to cause said plunger to enter said plate port.

3. An injection molding machine for plastic materials, including: a plurality of standards; a stationary platen secured to said standards and carrying a stationary mold section; a movable platen slidable on said standards and carrying a movable mold section; a valve body secured to said stationary platen; a sprue in said body and leading to said stationary mold section; a valve plate slidable in said valve body having a port therein which registers with said sprue when said plate is in one position; fluid pressure actuated means for reciprocating said valve plate on said stationary platen; a support secured to said standards; material injecting means movable on said support to engage and disengage said valve body at said sprue; fluid pressure actuated means on said support for operating said material injecting means; a source of fluid pressure; ducts in said standards connected to said source; pipes connected to certain of said ducts and to said valve operating means; other pipes connected to the remaining ducts and to said means for operating said injecting means; a plunger positioned adjacent the path of said valve plate and adapted to enter said valve plate port when the latter is in retracted position; and means for operating said plunger when said port is in registry therewith.

4. In injection molding apparatus of the type having means for supporting a mold and means for injecting a plastic material into said mold under pressure, the combination with said mold supporting means of: means forming a passage for the injection of said plastic material into said mold and providing a channel crossing said passage; a valve in the form of a plate reciprocably and slidably mounted in said channel and provided with a port which registers with said passage in one position of said valve to permit the injection of plastic into said mold, and registers with another passage in another position of said valve; a plunger aligned with said last mentioned passage and adapted to reciprocate therein and to pass through said port when the same is aligned with said passage; and means for reciprocating said valve from one of said positions to the other, said valve closing said first mentioned passage when said port is not in register therewith.

5. An injection molding machine for plastic materials, including: a movable injection cylinder; a mold having a passage for receiving plasticized material from said cylinder; a source of plastic material for said cylinder; a ram movable in one direction in said cylinder to admit a charge of material to said cylinder from said source, and in another direction to eject the charge from said cylinder; means for actuating said ram and for moving said cylinder in such manner that the interior of said cylinder is placed in fluid-tight communication with the cavity of said mold prior to actuation of said ram to eject the charge from said cylinder through said passage into said mold; means intermediate said mold and said injection cylinder forming a passage for the injection of said plastic material into said mold and having a seat at the entrance of said passage to receive said injection cylinder in fluid-tight engagement, said means providing a channel crossing said fluid passage; a valve plate reciprocably mounted in said channel and provided with a port which registers with said passage in one position of said plate to permit the injection of plastic material into said mold; a plunger adjacent the path of said plate and adapted to pass into said port when the same is in registry therewith; and means for reciprocating said valve plate from one of said positions to the other to first open said fluid passage and then to close the same and to register said port with said plunger.

6. An injection molding machine for plastic materials, including: a movable injection cylinder; a mold having a passage for receiving plasticized material from said cylinder; a source of plastic material for said cylinder; a ram movable in one direction in said cylinder to admit a charge of material to said cylinder from said source, and in another direction to eject the charge from said cylinder; means for actuating said ram and for moving said cylinder in such manner that the interior of said cylinder is placed in fluid-tight communication with the cavity of said mold prior to actuation of said ram to eject the charge from said cylinder through said passage into said mold; a valve body intermediate said mold and said injection cylinder forming a passage for the injection of said plastic material into said mold and having a seat at the entrance of said passage to receive said injection cylinder in fluid-tight engagement, said valve body providing a channel crossing said fluid passage; a valve plate reciprocably mounted in said channel and provided with a port which registers with said passage in one position of said plate to permit the injection of plastic material into said mold; a plunger adjacent the path of said plate and adapted to pass into said port when the same is in registry therewith; means for reciprocating said valve plate from one of said positions to the other to first open said fluid passage and then to close the same and to register said port with said plunger; and an electromagnet mounted on said valve body adapted to operate said plunger upon the retraction of said valve plate to passage closing position.

7. In injection molding apparatus of the type having means for supporting a mold and means for injecting a plastic material into said mold under pressure, the combination with said mold supporting means of: means forming a passage for the injection of said plastic material into said mold and providing a channel crossing said passage; a valve plate reciprocably and slidably mounted in said channel and provided with a port which registers with said passage in one position of said plate to permit the injection of plastic into said mold, said plate closing said passage when said port is not in registry therewith; means adjacent the path of said plate and in registry with said port when said plate is in a retracted position to remove any material lodged in said port; and means for reciprocating said valve plate from one of said positions to the other to alternately open and close said passage and clear said port.

GEORGE F. ROTSLER.

REFERENCES CITED

The following references are of record in the file of this patent:

UNITED STATES PATENTS

| Number | Name | Date |
|---|---|---|
| 969,539 | Kitchen | Sept. 6, 1910 |
| 1,674,387 | Campbell | June 19, 1928 |
| 2,035,801 | Gastrow | Mar. 31, 1936 |
| 2,090,489 | Sommerfeld | Aug. 17, 1937 |
| 2,111,857 | Jeffery | Mar. 22, 1938 |
| 2,274,800 | Lester | Mar. 3, 1942 |
| 2,319,482 | Tucker | May 18, 1943 |
| 2,333,056 | Thoreson et al. | Oct. 26, 1943 |
| 2,351,774 | McGowen | June 20, 1944 |
| 2,374,468 | Van Open | Apr. 24, 1925 |

FOREIGN PATENTS

| Number | Country | Date |
|---|---|---|
| 541,787 | Great Britain | Dec. 11, 1941 |
| 564,464 | Germany | Nov. 19, 1932 |